United States Patent [19]

Mallon et al.

[11] Patent Number: 4,467,656
[45] Date of Patent: Aug. 28, 1984

[54] TRANSDUCER APPARATUS EMPLOYING CONVOLUTED SEMICONDUCTOR DIAPHRAGMS

[75] Inventors: Joseph R. Mallon, Franklin Lakes; Anthony D. Kurtz, Englewood, both of N.J.

[73] Assignee: Kulite Semiconductor Products, Inc., Ridgefield, N.J.

[21] Appl. No.: 472,850

[22] Filed: Mar. 7, 1983

[51] Int. Cl.³ .............................................. G01L 9/06
[52] U.S. Cl. ................................. 73/727; 73/DIG. 4; 338/4; 338/42
[58] Field of Search .................. 73/721, 727, DIG. 4; 357/26; 310/800; 338/4, 42

[56] References Cited

U.S. PATENT DOCUMENTS

| 3,654,579 | 4/1972 | Kurtz et al. | 73/727 |
| 4,241,325 | 12/1980 | DiGiovanni | 338/4 |
| 4,400,869 | 8/1983 | Wilner et al. | 357/26 |

Primary Examiner—Donald O. Woodiel
Attorney, Agent, or Firm—Arthur L. Plevy

[57] ABSTRACT

A pressure transducer employing a semiconductor diaphragm having a convoluted central section surrounded by a rigid peripheral section. The convolutions are a series of concentric grooves formed as squares producing a square nonplanar diaphragm in the preferred embodiment. The convolutions are formed on the semiconductor wafer by an anisotropic etch. Piezoresistive devices are diffused into the diaphragm in the peripheral region to form a bridge array. The transducer structure thus formed is capable of producing a linear and large magnitude voltage signal in response to a relatively small applied pressure or force.

10 Claims, 2 Drawing Figures

TRANSDUCER APPARATUS EMPLOYING CONVOLUTED SEMICONDUCTOR DIAPHRAGMS

BACKGROUND OF INVENTION

This invention relates to pressure sensors and more particularly to a pressure sensor employing a semiconductor convoluted diaphragm.

Typical prior art pressure sensors employing piezoresistive devices operated with a thin "coin-like" diaphragm of a circular, square or rectangular plan configuration. The piezoresistive sensors were then diffused or otherwise deposited upon the diaphragm.

Many examples of such structures exist in the prior art. See for example U.S. Pat. No. 3,654,579 entitled ELECTROMECHANICAL TRANSDUCERS AND HOUSINGS by A. D. Kurtz et al issued on Apr. 14, 1972 and assigned to the assignee herein.

In displacement or pressure transducers the diaphragm is subjected to a force the magnitude of which is designated by the resistance change of the sensors. The desirable mode of operation for such diaphrams is bending. This bending produces surface fiber strains which are sensed by piezoresistive elements. In any event, at low pressure and large forces the diaphragm apart from bending tends to stretch. The stretching of the diaphragm is a nonlinear function of applied force or pressure.

A diaphragm may be looked upon as a spring element which supports the applied laod. Deflection of the center is caused by the application of load. If all the applied load is supported by bending, then this deflection is linear. If on the other hand, a portion of the applied load is resisted by a restoring force caused by stretching, then little deflection is caused by this portion of the load. It is found that the center deflection becomes nonlinear in a regressive and in turn the fiber strains are similarly nonlinear. This stretch effect is very noticeable and objectionable in low pressure transducer structures because such structures employ thin diaphrams which off little resistance to stretching. In general such low pressure piezoresistive transducers must be down rated or reduced in full range sensitivity to maintain linear response at low pressure. The greater the stiffness of the diaphragm, the greater the pressure that the diaphragm can handle and thick diaphragms are usable as high pressure transducers. Thin diaphragms are rather difficult to manufacture and therefore low pressure diaphragms require a relatively large area.

In order to alleviate the nonlinearity due to stretching, the prior art employed convoluted or corrugated diaphragms. These diaphragms exhibit a large range of deflection to applied pressure and therefore the stretching effect was not as pronounced. Typically, such diaphrams are used in conjunction with a push rod and beam to form a relatively complex pressure responsive structure. In any event, such diaphragms were machined from a suitable metal and were and are extremely difficult to manufacture. Furthermore, the strain sensors or gages were separately positioned and mounted on the convoluted structures or associated ancillary flexures resulting in additional problems which affected the transducer performance and linearity. These problems were inherent in the bonding techniques used to secure the sensors to the diaphragm, the dissimilar materials and associated temperature effects and a host of other problems.

It is therefore desirable to provide a convoluted silicon diaphragm for low pressure operation (15 psi or less) wherein semiconductor sensors are directly diffused into the diaphragm by integrated circuit techniques. Semiconductor technology provides a precise, economical and effective means of both fabricating the complex nonplanar diaphragm structure and integrating the piezoresistive elements.

BRIEF DESCRIPTION OF THE PREFERRED EMBODIMENT

A pressure or displacement transducer employs a semiconductor convoluted diaphragm having a central portion manifesting a plurality of concentric recesses or corrugations on both sides with a thick outer peripheral area with at least one semiconductor sensor deposited on said diaphragm within the peripheral area with a portion of said sensor being located proximate to an edge of an outer convolution.

DETAILED DESCRIPTION OF THE FIGURES

Figure 1:
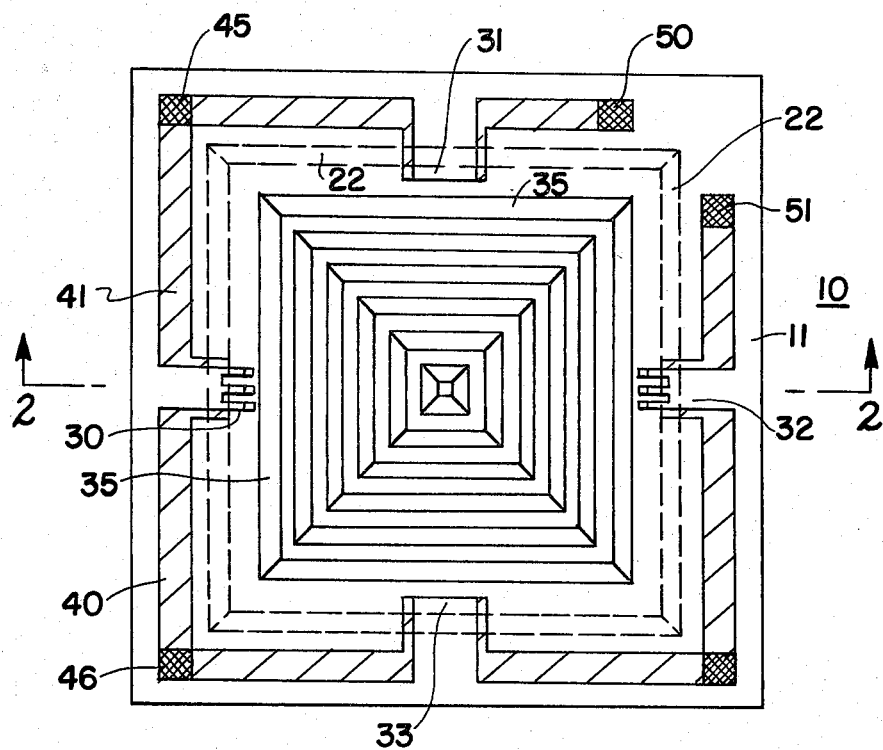
FIG. 1 is a top plan view of a pressure or displacement transducer according to this invention.

Referring to FIG. 1, there is shown a top plan view of a pressure sensor 10 employing a convoluted or corrugated diaphragm 11.

Essentially, the diaphragm 11 is shown as relatively square in configuration although rectangular, circular or other configurations could be employed as well. The diaphragm 11 is fabricated from single crystal silicon and is typically square having sides of about 0.08 inches with a thickness of 0.0035 inches. It is understood that the dimensions are given by way of example.

In general, a square or a circular diaphragm is symmetrical about the center point of the diaphragm. The aspect ratio, which is the ratio of the length of the diaphragm to the width is 1:1. In a square or circular diaphragm the radial stress is of a substantial magnitude and of opposite sign at the center of the diaphragm than at its periphery. In a rectangular diaphragm the length to width is greater than 1:1 and the ratio of longitudinal to transverse stress at the center which is one for a diaphragm which has an aspect ratio of one and correspondingly increases for higher aspect ratios. The longitudinal stress is defined as the stress parallel to the short axis of the diaphragm.

In a convoluted structure such as that shown in FIG. 1, the square diaphragm configuration is conveniently fabricated and hence formation of the diaphragm and of the recesses or convolutions is easy to implement. The use of an anisotropic etch is very convenient for the formation of the structure shown. Such an etch produces sharp well-defined contours of precise dimensions. The surface of the diaphragm 11 contains a series of concentric grooves of increasing size which form increasing squares in the plan view. The preferred embodiment uses a square diaphragm but other plan views are possible or desirable. For instance, a circular plan configuration can be fabricated using isotropic etchants. Alternately, a diaphragm of a quasi-rectangular plan view similar to the structure shown in U.S. Pat. No. 4,236,137 entitled SEMICONDUCTOR TRANS- DUCERS EMPLOYING FLEXURE FRAMES is-
sued on Nov. 25, 1980 to Anthony D. Kurtz, et al and
assigned to the assignee herein.

Figure 2:
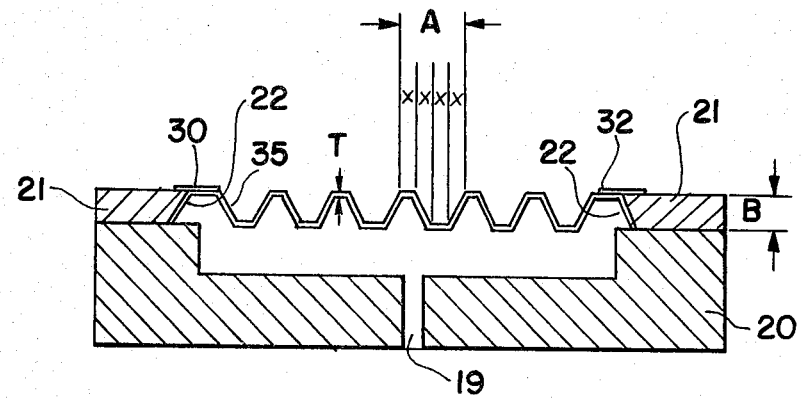
FIG. 2 is a cross-sectional view taken through line 2—2 of FIG. 1.

Referring to FIG. 2, there is shown a cross section of
the pressure sensor 10 taken through line 2—2 of FIG.
1.

As can be seen from FIG. 2, the convolutions appear
trapezoidal in cross section. Thus, as seen in FIG. 2, the
central area of the diaphragm appears convoluted and is
of a given thickness (i.e. 0.0005 inches) with the concentric square patterns forming the trapezoidal cross-sectional crests and valleys in a repeating sequence on both
sides with crests aligning with valleys as shown. The
outer peripheral area 21 of the diaphragm is thicker for
support purposes and as will be explained is the area
which contains the diffused piezoresistive sensors. Each
recess which is a square pattern is formed by an anisotropic etch which results in the sloping sidewalls. In
regard to the dimensions given above, the trapezoidal
area A possesses the following dimensions: the thickness T of the convoluted area is 0.0005 inches. The
dimensions X which determine the slope of the trapezoidal area are 0.0022 inches respectively, with the
dimension B being 0.0035 inches. The diaphragm is
mounted on a base support member 20 which is bonded
about the periphery of the diaphragm by means of a
glass or other type of bond. The base member 20 may be
fabricated from silicon, metal or glass and has a central
aperture 19 which may serve as a pressure port. This
operation can be eliminated to form an absolute or
sealed transducers as required.

As can be seen from FIG. 2, the sides of the convoluted diaphragm 10 as extending into the large peripheral bonding area 20 slope at the same angle as the sides
of the trapezoidal area. This is depicted by numeral 22
on FIG. 2.

Referring to FIG. 1, there is shown four resistor
configurations 30, 31, 32, and 33 diffused into the surface of the diaphragm 10 and symmetrically located
about the center lines. Resistors 30 and 31 are larger in
magnitude than resistors 31 and 33. The resistors are
formed on the diaphragm by conventional semiconductor deposition techniques and are thus integrally formed
within the diaphragm structure. The techniques of fabricating such resistor structures are well-known in the
art and may comprise solid state diffusion or epitaxial
growth. For examples of suitable processes for forming
such resistors see U.S. Pat. No. 3,654,579 entitled
ELECTROMECHANICAL TRANSDUCERS AND
HOUSINGS issued on Apr. 4, 1972 to A. D. Kurtz et al
and assigned to the assignee herein. See also U.S. Pat.
No. 3,873,956 entitled INTEGRATED TRANSDUCER ASSEMBLIES issued on Mar. 25, 1975 to A.
D. Kurtz et al and assigned to the assignee herein.

The resistors 30 and 31 respond to transverse stress
and as seen in FIG. 1 are located near the edge of recess
35 and overlying the sloped wall 22. This position enables resistors 30 and 32 to respond to transverse stress in
an optimum manner. Resistors 31 and 33 are located
between the sloping wall section 22 and the outer edge
of recess 35 and, based on the configuration and orientation, respond to mainly longitudinal stress. The terminals of the resistors are directed through suitable
contact lead areas as 40 and 41 to aluminum terminal
pads 45 and 46 located about the periphery of the diaphragm as shown. The formation of the terminal pads as
45 and 46 and the contact lead areas 40 and 41 are also
well-known in the art and are formed by conventional
diffusion and metallization techniques, examples of
which are also given in the above noted patents.

Essentially, as can be ascertained, the resistor configurations are connected on the substrate as a Wheatstone
bridge array with the bias for the bridge designated as
+ in and − in and the output designated as + out and
− out. The bridge may have an open bridge to allow
resistor or other compensating components to be added
between the + out terminals 50 and 51.

As indicated, the square convoluted areas are formed
directly on the silicon diaphragm by an anisotropic
etch.

As is known, anisotropic etching of silicon varies
with the crystallographic orientation of the silicon substrate and is an etch whose rate depends upon the orientation of the crystal and is only effective for etching
crystals of silicon of special orientation.

As indicated, the etch rate in anisotropic etching
varies with the crystallographic orientation of the wafer
or diaphragm 11 and decreases in the following order:
$(100) > (110) > (111)$. In order to provide the anisotropic
etch, etchants such as pyrocatechol, $(C_6 H_4 (OH)_2)P$,
ethylene diamine $(NH_2) CH_2 NH_2$ (ED) and water are
employed.

The use of such etchants to provide anisotropic
etches are well known in the art and for example, see an
article entitled "Anisotropic Etching of Silicon" by K.
E. Bean published in the *IEEE Transactions on Electron
Devices*, October, 1978, Volume ED-25, No. 1 on Page
1185.

The wafer of silicon used to form the diaphragm 11
may be single crystal silicon of (100) orientation. The
rate of etch can be accurately controlled and the wafer
of silicon may be etched prior to the diffusion of the
sensors or piezoresistances 30 to 33.

As indicated, various etching solutions are well
known which provide etch rates of 50 micrometers per
hour. This low rate of etching assures that one can
accurately control the dimensions of the convolutions
to an extremely precise value.

Based on the above, we can see that the silicon diaphragm and sensor assembly as above described, due to
the convolutions, is anisotropic to stress. The convolutions afford substantial resistance to transverse stretching and, therefore, allows larger forces to be applied
with little nonlinear response. On the other hand, the
convoluted diaphragm is radially very flexible and full
bending response to applied load is allowed. The convoluted diaphragm is substantially more linear in its
response than similarly fabricated planar diaphragms.

The diaphragm, due to the convolutions, does not
exhibit any appreciable effects due to stretching to enable the sensors as positioned to provide a linear output
determinative of applied force or pressure strictly due
to the bending of the structure. In this manner the structure can be used to optimumly fabricate pressure or
displcement transducers for low pressure operation (15
psi or less). If one compares structures of similar fabrication, then it is seen that a convoluted diaphragm as
above described provides 2 to 5 more output for a given
linearity than a flat or bossed diaphragm.

We claim:
1. A pressure transducer, comprising:
   a convoluted semiconductor diaphragm member having a central portion manifesting a plurality of
   concentric recesses forming a series of convolutions and an outer nondeflecting peripheral area at least one semiconductor sensor deposited on said diaphragm within said peripheral area with a portion of said sensor being located proximate to an edge of an outer convolution.

2. The pressure transducer according to claim 1, wherein said semiconductor diaphragm is square in configuration with said concentric recesses being a series of square shaped convolutions.

3. The pressure transducer according to claim 1, wherein said semiconductor sensor is diffused into the surface of said diaphragm.

4. The pressure transducer according to claim 1, wherein said concentric recesses each have a trapezoidal cross section.

5. The pressure transducer according to claim 1, wherein said semiconductor diaphragm is fabricated from silicon.

6. The pressure transducer according to claim 1, wherein said semiconductor sensors are piezoresistors.

7. The pressure transducer according to claim 1, wherein said convoluted recesses are formed by an anisotropic etch.

8. A pressure transducer comprising:

a convoluted semiconductor diaphragm of a relatively square shaped configuration having a central area manifesting a series of concentric square shaped convolutions with an outer nondeflecting peripheral area first and second piezoresistive sensors deposited on said diaphragm within said peripheral area and located on opposite sides along the same first axis and operative to respond to mainly transverse stress, third and fourth piezoresistive sensors deposited on said diaphragm within said peripheral area and located on opposite sides of a second axis, perpendicular to said first axis and operative to respond to mainly longitudinal stress.

9. The pressure transducer according to claim 8 further comprising:

interconnecting means for connecting said first, second, third and fourth piezoresistive sensors in a Wheatstone bridge array.

10. The pressure transducer according to claim 9, wherein said convolutions are formed by an anisotropic etch.

* * * * *